US008654935B2

(12) United States Patent
Jaiswal et al.

(10) Patent No.: US 8,654,935 B2
(45) Date of Patent: *Feb. 18, 2014

(54) METHOD AND SYSTEM FOR USING CONVERSATIONAL BIOMETRICS AND SPEAKER IDENTIFICATION/VERIFICATION TO FILTER VOICE STREAMS

(71) Applicant: International Business Machines Corporation, Armonk, NY (US)

(72) Inventors: Peeyush Jaiswal, Boca Raton, FL (US); Naveen Narayan, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/901,098

(22) Filed: May 23, 2013

(65) Prior Publication Data

US 2013/0262112 A1    Oct. 3, 2013

Related U.S. Application Data

(63) Continuation of application No. 12/246,056, filed on Oct. 6, 2008.

(51) Int. Cl.
*H04M 1/64*    (2006.01)

(52) U.S. Cl.
USPC ............... 379/88.02; 379/265.07; 704/272

(58) Field of Classification Search
USPC .......... 379/88.04, 265.02; 704/249, 246, 221, 704/272
See application file for complete search history.

(56) References Cited

U.S. PATENT DOCUMENTS

| | | | |
|---|---|---|---|
| 5,659,662 A * | 8/1997 | Wilcox et al. ................ 704/245 |
| 6,421,645 B1 * | 7/2002 | Beigi et al. .................... 704/272 |
| 6,510,415 B1 * | 1/2003 | Talmor et al. ................ 704/273 |
| 7,177,808 B2 | 2/2007 | Yantorno et al. | |
| 7,295,970 B1 * | 11/2007 | Gorin et al. ................... 704/221 |
| 7,299,177 B2 * | 11/2007 | Broman et al. ............... 704/246 |
| 7,318,032 B1 | 1/2008 | Chaudhari et al. | |
| 2005/0096906 A1 * | 5/2005 | Barzilay ....................... 704/249 |
| 2006/0287863 A1 | 12/2006 | Santos et al. | |
| 2008/0205624 A1 * | 8/2008 | Mandalia et al. ........ 379/265.02 |

* cited by examiner

*Primary Examiner* — Mohammad Islam
*Assistant Examiner* — Van D Huynh
(74) *Attorney, Agent, or Firm* — John Pivnichny; Roberts Mlotkowski Safran & Cole, P.C.

(57) ABSTRACT

A method implemented in a computer infrastructure having computer executable code having programming instructions tangibly embodied on a computer readable storage medium. The programming instructions are operable to receive an audio stream of a communication between a plurality of participants. Additionally, the programming instructions are operable to filter the audio stream of the communication into separate audio streams, one for each of the plurality of participants, wherein each of the separate audio streams contains portions of the communication attributable to a respective participant of the plurality of participants. Furthermore, the programming instructions are operable to output the separate audio streams to a storage system.

14 Claims, 4 Drawing Sheets

METHOD AND SYSTEM FOR USING CONVERSATIONAL BIOMETRICS AND SPEAKER IDENTIFICATION/VERIFICATION TO FILTER VOICE STREAMS

FIELD OF THE INVENTION

The present invention generally relates to conversational biometrics and speaker identification and/or verification, and more particularly, to a method and system for using conversational biometrics and speaker identification and/or verification to filter voice streams during mixed mode communication.

BACKGROUND

The feature set provided by quality assurance call recording/quality monitoring solutions are diverse. For example, they include recording calls, scraping desktops and storing these in an archival mechanism for business intelligence.

In general, a quality assurance (QA) system records all parties involved in a certain transaction. For example, consider the scenario where a customer calls into an interactive voice response (IVR) system, responds to IVR prompts and then opts out to an agent. With this exemplary scenario, the QA system will record all three parties, i.e., the IVR prompts, the customer and the agent. In addition, the QA system will also record any conversations that the agent may have to fully resolve a customer issue. For example, one such conversation to be recorded by the QA system may be the agent consulting with a manager, while the agent places the customer on hold. The data collected and/or recorded is stored and passed, for example, to a statistical business analysis module to extract relevant information.

However, the drawback of this conventional approach is that data is recorded as a whole entity. That is, the recording system does not distinguish between the caller, the IVR and/or the agent(s) who handle the transaction. As a result, the data is not filtered based upon speaker and there is some level of manual intervention required when the data is analyzed for content.

Accordingly, there exists a need in the art to overcome the deficiencies and limitations described hereinabove.

SUMMARY

In a first aspect of the invention, a method is implemented in a computer infrastructure having computer executable code tangibly embodied on a computer readable medium having programming instructions. The programming instructions are operable to receive an audio stream of a communication between a plurality of participants. Additionally, the programming instructions are operable to filter the audio stream of the communication into separate audio streams, one for each of the plurality of participants, wherein each of the separate audio streams contains portions of the communication attributable to a respective participant of the plurality of participants. Furthermore, the programming instructions are operable to output the separate audio streams to a storage system.

In another aspect of the invention, a system comprises a conversational biometric analysis and speaker identification-verification (CB/SIV) tool operable to receive an audio stream of a communication between a plurality of participants. Further, the CB/SIV tool is operable to perform an identification process. Additionally, the CB/SIV tool is operable to filter the audio stream of the communication into separate audio streams, one for each of the plurality of participants, wherein each of the separate audio streams contains portions of the communication attributable to a respective participant of the plurality of participants.

In an additional aspect of the invention, a computer program product comprising a computer usable storage medium having readable program code embodied in the medium is provided. The computer program product includes at least one component operable to filter an audio stream of a communication into separate audio streams, one for each of a plurality of participants, wherein each of the separate audio streams contains portions of the communication attributable to a respective participant of the plurality of participants by matching the portions of the communication attributable to the respective participant using a voice print for the respective participant and assigning the portions of the communication attributable to the respective participant to the separate audio stream for the respective participant.

In a further aspect of the invention, a method comprises providing a computer infrastructure operable to receive an audio stream of a communication between a plurality of participants. Additionally, the computer infrastructure is operable to filter the audio stream of the communication into separate audio streams, one for each of the plurality of participants, wherein each of the separate audio streams contains portions of the communication attributable to a respective participant of the plurality of participants. Furthermore, the computer infrastructure is operable to output the separate audio streams to a storage system.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
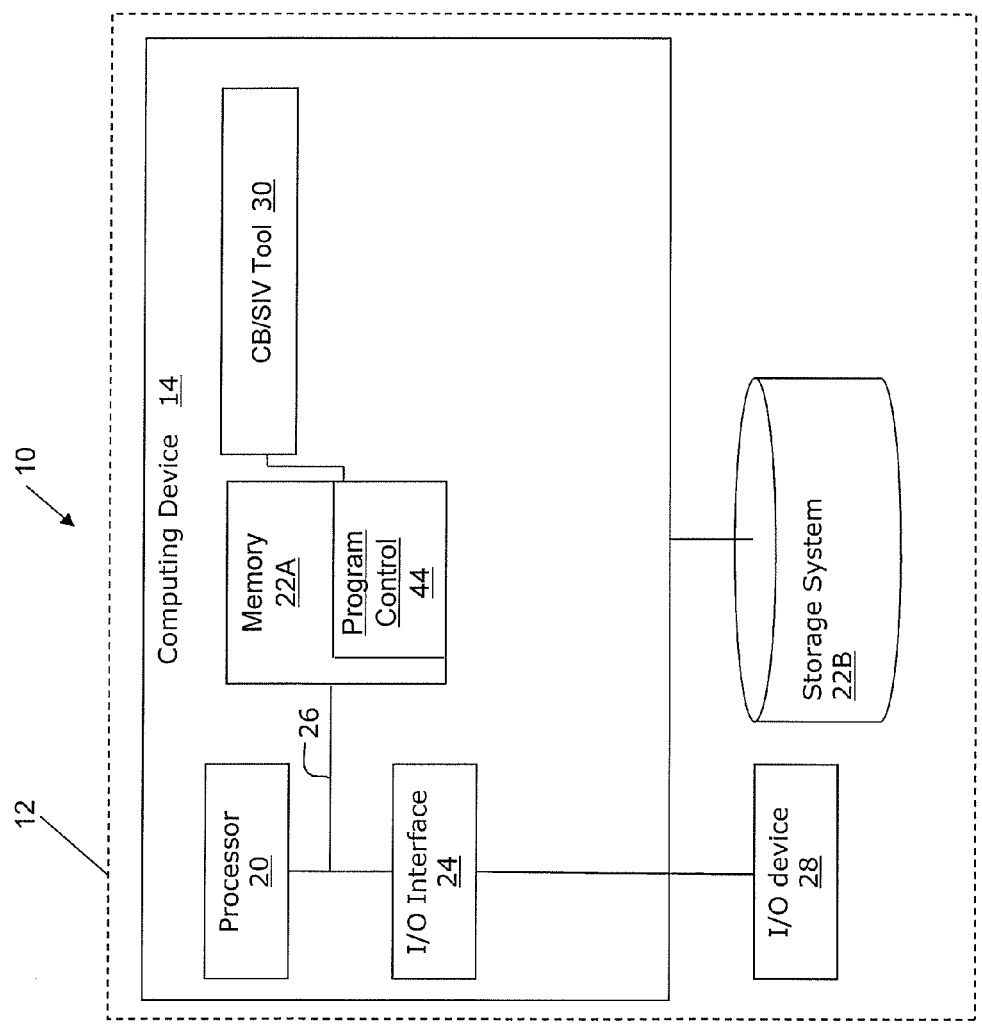
FIG. 1 shows an illustrative environment for implementing the steps in accordance with the invention.

The present invention generally relates to conversational biometrics and speaker identification and/or verification, and more particularly, to a method and system for using conversational biometrics and speaker identification and/or verification to filter voice streams during mixed mode communication. By implementing the present invention, the recording system will distinguish between different participants of the conversation, e.g., between the caller, the IVR and/or the agent(s) who handle the transaction. As a result, the data is filtered based upon speaker identification and the level of manual intervention is minimized when the data is subsequently analyzed for content.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device,
a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a conversational biometrics analysis and speaker identification-verification (CB/SIV) tool 30. The CB/SIV tool 30 is operable to receive seed phrases and store the seed phrases as voice prints, perform speaker verification and/or speaker identification using the voice prints, and filter a signal into separate voice streams for each participant in a conversation, e.g., the processes described herein. The CB/SIV tool 30 can be implemented as one or more program code in the program control 44 stored in memory 22A as separate or combined modules.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 having program code controls the CB/SIV tool 30. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

CB/SIV Tool

In accordance with aspects of the invention, a conversational biometrics analysis engine and a speaker identification-verification engine can be combined in a CB/SIV tool 30 and placed along with other server components to further aid in recording and caller verification and/or identification. However, it should be understood that the conversational biometrics analysis engine and the speaker identification-verification engine of the CB/SIV tool 30 may be separate components. The CB/SIV tool 30 can provide speaker verification and/or speaker identification. In embodiments, the CB/SIV tool 30 may first perform a speaker identification process to create a list of "best matches" and then perform a series of verification processes to determine a conclusive match.

More specifically, the CB/SIV tool 30 has two phases: an enrollment phase and a verification and/or identification phase. During the enrollment phase, the speaker's voice is recorded and, for example, a number of features are extracted to form a uniquely identifiable voice print, template, or model. Moreover, as described below, in the verification phase, a speech sample or "utterance" is compared against the previously created voice print. In contrast to the verification phase, which compares an utterance against a single voice print, the identification phase compares the utterance against multiple voice prints in order to determine the best match(es). As should be understood, because of the process involved, a verification process may be a faster than an identification process.

In accordance with aspects of the invention, the capture of the biometric, e.g., voice print, may be non-invasive. More specifically, in embodiments, the CB/SIV tool 30 may use existing microphones and voice transmission technology, e.g., telephones, allowing recognition over long distances via ordinary telephones (e.g., wired or wireless).

According to further aspects of the invention, during call recording (regular transaction progression), the CB/SIV tool 30 is operable to dynamically filter a voice (e.g., a customer) from a set of voices involved in a transaction (e.g., the customer, an operator(s) and the IVR system), authenticate the voice and allow a user to take actions based upon the result of that authentication.

In accordance with additional aspects of the invention, the CB/SIV tool 30 is operable to dynamically filter the contents of a mixed input of voices into individual voice streams for each party of a conversation. More specifically, the CB/SIV tool 30 uniquely identifies the various voice sources, filters out the voices as separate streams and stores the separate streams, e.g., in storage system 22B of FIG. 1. Furthermore, in embodiments, the resulting separated voice streams may then be passed over to a rules engine for further processing.

It should be understood that there is a difference between authentication (commonly referred to as speaker verification or speaker authentication) and identification. Speaker verification (or authentication) is the computing task of validating a user's claimed identity using characteristics extracted from their voices. If the speaker claims to be of a certain identity and the voice is used to verify this claim this is called verification or authentication. In a sense, speaker verification is a 1:1 match where one speaker's voice is matched to one template (also called a "voice print" or "voice model"). Speaker verification is usually employed as a "gatekeeper" in order to provide access, for example, to a secure system (e.g., telephone banking). These systems may operate with the user's knowledge and typically require the user's cooperation. More specifically, for example, verification authenticates a user in conjunction with, for example, an identified previously stored template, e.g., a voice print. Illustratively, a biometric sample is captured and compared with the identified template, e.g., voice print, of the user, for example, stored in a database to verify the user. That is, the identified previously stored template is compared to the sampled voice stream in a 1:1 match. In embodiments, the particular identified template used to verify a user may be identified by, for example, a smart card, a usernames and/or an ID number.

In contrast, speaker identification authenticates its users from a biometric characteristic alone without the use of smart cards, usernames or ID numbers. For speaker identification, the biometric sample is compared to all records within the database and a closest match score is returned. The closest match within the allowed threshold is deemed the individual and authenticated. Thus, identification is the task of determining an unknown speaker's identity, such that speaker identification is a 1:N match where the voice is compared against N templates. Speaker identification systems can also be implemented covertly without the user's knowledge to identify talkers in a discussion, alert automated systems of speaker changes, check if a user is already enrolled in a system, etc.

From a security perspective, identification is also different from verification. For example, presenting your passport at border control is a verification process; the agent compares your face to the picture in the document. Conversely, a police officer comparing a sketch of an assailant against a database of previously documented criminals to find the closest match (es) is an identification process.

In performing the identification process and the separation of the voice stream into separate voice streams, the CB/SIV tool 30 need not compare each sampled voice of an ongoing conversation with all voice prints in a database, e.g., a 1-to-N comparison. Instead, once the CB/SIV tool 30 identifies the parties (for example, three parties) to a conversation using the voice prints using, e.g., a 1-to-N comparison, the CB/SIV tool 30 is aware that any subsequently recorded voice for the given conversation is one of those three identified voices. As such, subsequent to an initial identification of the parties of a conversation, the CB/SIV tool 30 compares a particular voice stream with the three corresponding voice prints using, e.g., a 1-to-3 comparison.

Furthermore, in accordance with aspects of the invention, the CB/SIV tool 30 may additionally utilize origin of voice detection to perform or aid in the separation of a signal into its separate voice streams. As should be understood, origin of voice detection can determine the source of a voice, e.g., an internal line versus an external line. Thus, the CB/SIV tool 30 may utilize origin of voice detection to perform or aid in the separation of a signal into its separate voice streams.

Moreover, in accordance with further aspects of the invention, the present invention may include separate databases for separate players in a conversation. For example, with a call center scenario, discussed further below, the system may include separate databases for agents, IVRs and customers. Moreover, with a medical professional's office scenario, discussed further below, the system may include separate databases for medical professionals and patients. That is, in embodiments, voice prints for agents (or medical professionals) may be stored in an agent database and voice prints for callers (e.g., customers or patients) may be stored in a separate caller database (each of which may be stored in storage system 22B of FIG. 1). Using the separate databases may assist in performing a voice identification and/or verification. For example, in performing an initial identification (e.g., a 1-to-N matching), if the CB/SIV tool 30 is aware that the particular voice is an agent (e.g., using the above-described origin of voice detection), the CB/SIV tool 30 may access an agent voice print database to identify the agent. Moreover, by using the agent voice print database, the number N may be reduced (as the database only contains agent voice prints), and thus the identification process may be performed more quickly.

The CB/SIV tool 30 may utilize various technologies to process and analyze voice prints. For example, in embodiments, the CB/SIV tool 30 may utilize frequency estimation, hidden Markov models, Gaussian mixture models, pattern matching methodologies, neural networks, matrix representation and decision trees, amongst other technologies.

Moreover, the CB/SIV tool 30 may utilize, for example, the acoustic features of speech that have been found to differ between individuals. It should be understood that a speaker's voice is a physiological trait and a behavioral trait. A voice may be classified as a physiological trait, as acoustic patterns reflect anatomy (e.g., size and shape of the throat and mouth, amongst other anatomic features) of a speaker, causing for example, a particular pitch. On the other hand, in embodiments, a voice may be classified as behavioral trait based on the study of the way a person speaks, for example, learned behavioral patterns (e.g., voice pitch, speaking style, amongst other learned behavioral patterns).

In embodiments, the CB/SIV tool 30 may employ noise reduction methodologies to improve accuracy. This is because ambient noise levels can impede both collection of the initial and subsequent voice samples. However, performance degradation can result from, for example, changes in behavioral attributes of the voice and from enrollment using one telephone and verification on another telephone ("cross channel"). For example, voice changes due to, e.g., aging may impact system performance over time. Thus, in embodiments, the CB/SIV tool 30 may adapt the speaker models after each successful verification to capture such long-term changes in the voice.

In embodiments, the CB/SIV tool 30 may be a text-dependent system or text-independent system. With a text-dependent recognition, the text of the speech sample should be the same for the enrollment phase and the verification phase. Moreover, with a text-dependent system, prompts can either be common across all speakers (e.g., a common pass phrase) or unique. In addition, the use of shared-secrets (e.g., passwords and PINs) or knowledge-based information can be employed in order to create a multi-factor authentication scenario.

In contrast, text-independent systems are most often used for speaker identification as they require very little, if any, cooperation by the speaker. With text-independent systems, the text of the speech sample during the enrollment phase and identification phase may be different. In embodiments, the enrollment phase may occur without the user's knowledge. That is, in embodiments, the CB/SIV tool 30 may sample and store a voice print of the speaker without the speaker's awareness of the CB/SIV tool 30 action.

First Time/Enrollment Interaction

According to aspects of the invention, when a user first interacts with the system, the CB/SIV tool 30 records a seed phrase or first impression. The CB/SIV tool 30 uses the seed phrase or first impression to create a voice print for later identifying this particular user. Moreover, the first interaction is conducted under isolation. That is, the first interaction includes only one user interacting with one instance of the system. Thus, the system can capture an accurate voice print of a single user.

Moreover, it should be understood that, in embodiments, once a user enrolls with the present invention, e.g., by speaking the seed phrase, the user need not re-enroll on a subsequent phone call to the same system. That is, in embodiments, the system of the present invention may use a previously stored voice print of a user to perform verification and/or identification.

Contact Center Scenario

In embodiments, the system of the present invention may be used in a contact or call center environment. According to aspects of the invention, a caller, e.g., a customer, calls into a call center and the CB/SIV tool 30 prompts the caller to speak a seed phrase. The seed phrase is stored by the system as a voice print, for example, in storage system 22B of FIG. 1. Moreover, the voice print is passed to the CB/SIV tool 30, which uses the voice print to uniquely identify and/or verify the caller, as described further below.

The call/transaction is routed, e.g., by the IVR system, to an agent who may attempt to assist the customer. This may happen the first time the caller calls the call center or the $N^{th}$ time. Moreover, during a conversation with the agent, the agent can use the CB/SIV tool 30 to trigger a biometric verification of the caller. For example, once the voice is analyzed, the CB/SIV tool 30 prompts the agent if there is a perfect match between the customer voice print and the currently received customer voice stream. In embodiments, if there is a match, the agent may then carry out the remainder of the transaction. If there is not a match, the agent may take appropriate action, such as, for example, reporting the mismatch between the caller's claimed identity and the caller's real identity.

Additionally, the CB/SIV tool 30 samples the caller's voice and compares it dynamically against a voice print database to filter the caller's voice from that of the agent (and any other parties to the conversation). In embodiments, this may happen completely transparent to the caller. Moreover, as explained above, once the CB/SIV tool 30 is aware of all of the parties to a conversation, the CB/SIV tool 30 may only need to compare a received voice stream against the voice prints of the identified parties to the conversation. Moreover, if the CB/SIV tool 30 detects a voice stream that cannot be matched to one of the identified parties to the conversation, in embodiments, the CB/SIV tool 30 may then compare the unmatchable voice stream to all voice prints in the storage system. It should be understood that, in embodiments, this identification may occur in real time. Additionally, in embodiments, the CB/SIV tool 30 is dynamic, i.e., the caller need not speak into it separately.

According to further aspects of the invention, as an exception handling routing, in embodiments, the CB/SIV tool 30 is able to handle barge-ins. That is, for example, if the caller and the agent are both talking simultaneously or they are "barging" over each others' voices, the CB/SIV tool 30 can distinguish each individual speaker and separate out the different speakers into different streams.

Medical Transcription Scenario

As a further example of utilization of the present invention, consider medical transcription, which is a very manual process. That is, conventionally, a medical professional's office typically sends out feeds to an organization providing transcript services. This organization then listens (e.g., relying on human ears) through recordings between the medical professional and patient and prepares transcripts.

However, this process can be completely automated using the present invention. For example, medical professionals in a given practice may enroll themselves to the CB/SIV tool 30. More specifically, the medical professionals may speak a seed phrase for a voice print, which is stored in a database, e.g., storage system 22B (shown in FIG. 1) and which is used by the CB/SIV tool 30 to identify the medical professionals as the 'medical professional' (as opposed to, for example, patients and/or nurses). Additionally, in embodiments, the patient may speak a seed phrase for a voice print, which is stored in a database, e.g., storage system 22B (shown in FIG. 1), and which is used by the CB/SIV tool 30 to identify the patient as the 'patient.' Furthermore, as explained above, in embodiments, the patient may only need to speak the seed phrase once to be properly enrolled in the system. Thus, with subsequent visits to the medical professional's office, the patient need not be re-enrolled in the system of the present invention. However, the invention contemplates that the patient's seed phrase may be received with each visit to the medical professional's office.

Furthermore, the invention contemplates that the medical professional and the patient may be the only two parties to a conversation being recorded. As such, in embodiments, it may be necessary for only the medical professional to speak the seed phrase for creating respective voice prints. That is, the CB/SIV tool 30 is operable to filter out the patient's voice through a process of elimination, by ascertaining that the recorded voice is not the medical professional's voice using the medical professional's stored voice print.

In this implementation, any patient interaction that takes place using speech and/or dialog is recorded, e.g., by a recording system placed in the medical professional's office. Furthermore, this recording is passed over, in embodiments, either dynamically (e.g., in real time) or in a batch (e.g., at the end of an appointment or the end of a day) to the CB/SIV tool 30. Furthermore, the CB/SIV tool 30 is operable to filter the contents of the recording, uniquely identifying the medical professional and the patient and store each voice samples, for example, in a database, e.g., storage system 22B (shown in FIG. 1).

In embodiments, the stored voice samples may be time-stamped and business rules may be applied to them. For example, the voice samples can be passed through a speech-to-text filter to convert the speech to text and archived in an archival medium, as may be legally required. By implementing the present invention in the medical professional's office environment, the need for a medical professional to perform an isolated dictation in a recorder for a transcription agent to create text output may be eliminated or minimized.

Flow Diagrams

Figure 2:
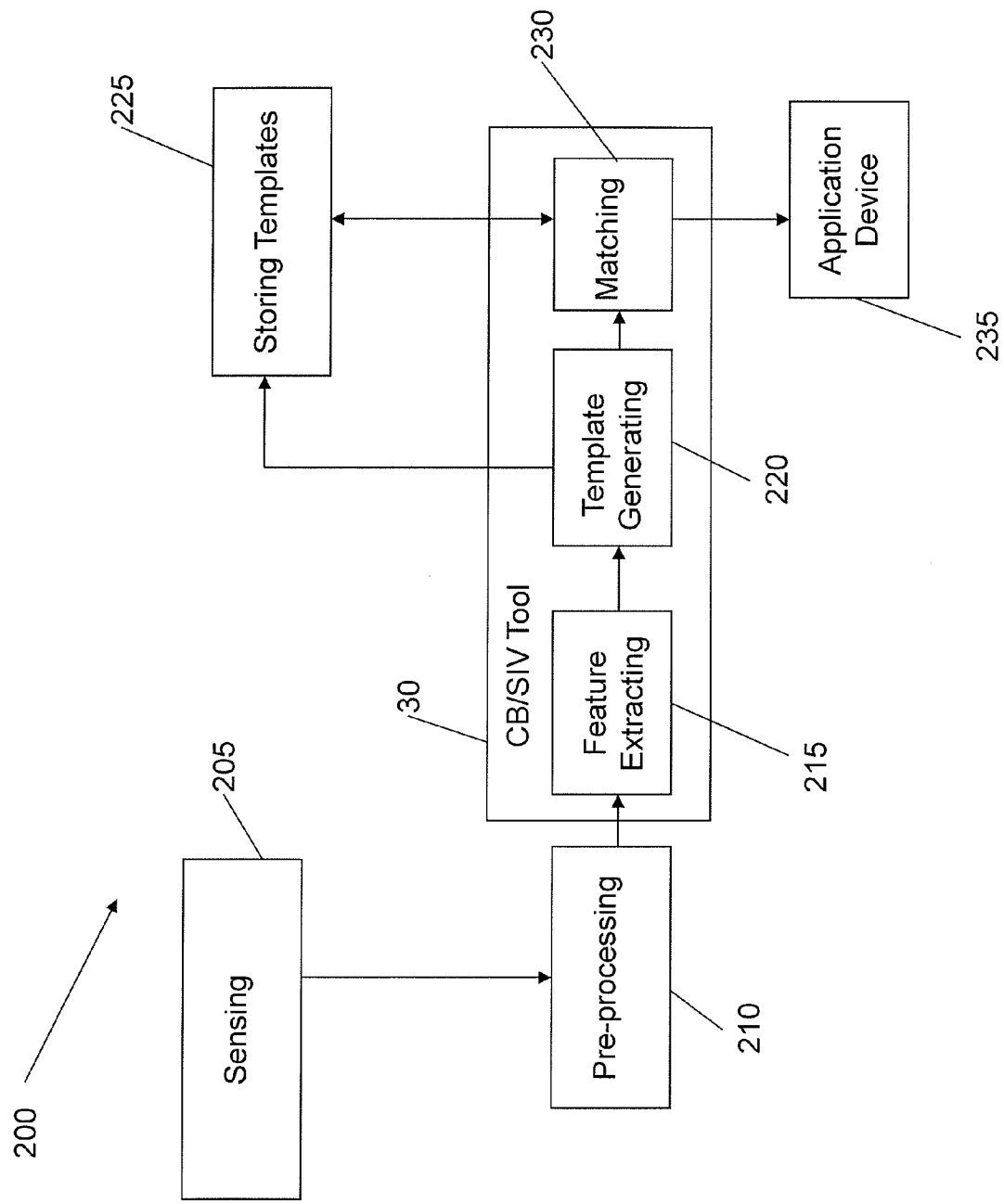
FIGS. 2-4 show exemplary flows for practicing aspects of the present invention.
Figure 3:
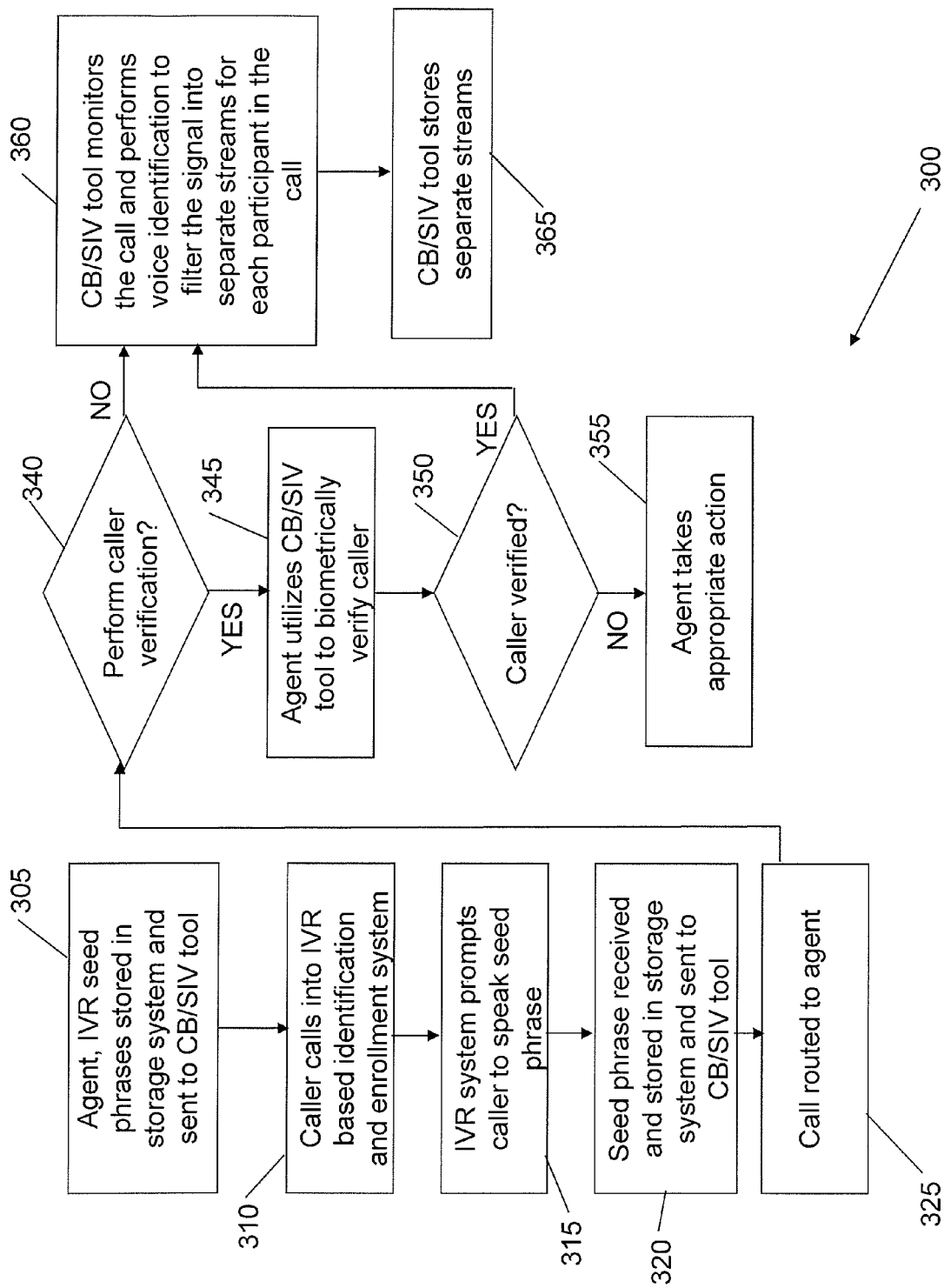
Figure 4:
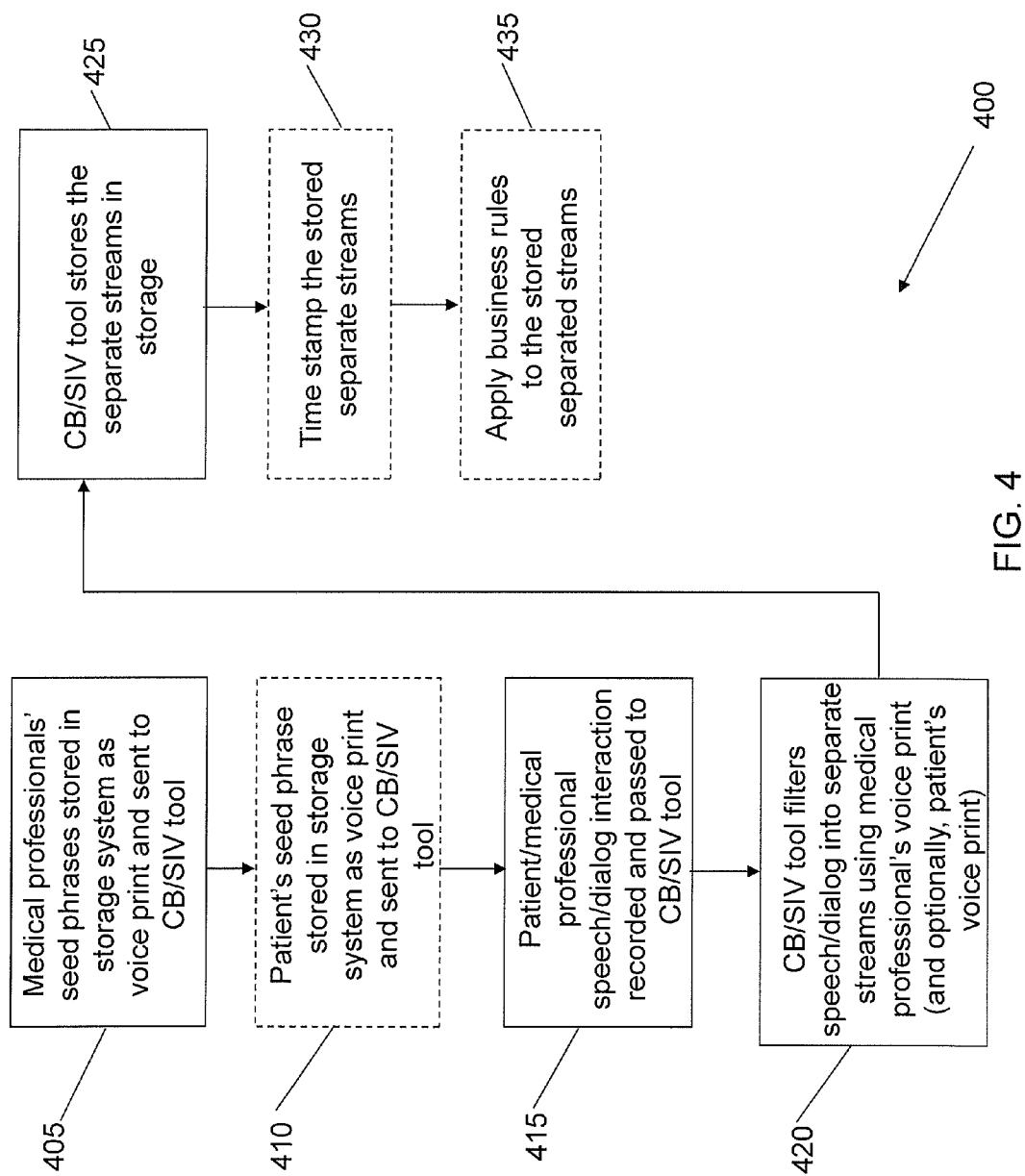

FIGS. 2-4 show exemplary flows for performing aspects of the present invention. The steps of FIGS. 2-4 may be implemented in the environment of FIG. 1, for example. The flow diagrams may equally represent a high-level block diagrams of the invention. The flowcharts and/or block diagrams in FIGS. 2-4 illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 2 shows an exemplary flow diagram 200 illustrating the utilization of the CB/SIV tool 30 in combination with other elements of the system of the present invention. As described above, the CB/SIV tool 30 is operable to perform an enrollment process and a verification and/or identification process. During the enrollment process, the CB/SIV tool 30 collects biometric information from an individual, e.g., a voice sample, and stores the voice sample as a voice print in a database, e.g., storage system 22B. During the verification and/or identification process, biometric information, e.g., a voice, is detected and compared with the stored voice prints.

As shown in FIG. 2, at step 205, a sensor interfaces between the real world and the system of the present invention. In embodiments, the sensor, e.g., a microphone, acquires biometric data. At step 210, a pre-processor (which may be embodied in the computer infrastructure 12 of FIG. 1) removes artifacts from the signal received by the sensor, to enhance the input (e.g., removing background noise, performing normalization, etc.) and sends this signal to the CB/SIV tool 30.

As shown in FIG. 2, with this exemplary arrangement, three processes are performed by the CB/SIV tool 30 including, at step 215, a feature extracting process, at step 220, a template generating process and, at step 230, a matching process. More specifically, at step 215, the feature extracting process extracts features from the signal, e.g., a voice stream. At step 220, the template generation process generates a template (e.g., a voice print) using the signal, e.g., voice stream. The template is a synthesis of all the characteristics extracted from the source, in an optimal size to allow for adequate identifiability.

If enrollment is being performed, at step 225, the template, e.g., voice print, is stored. In embodiments, the templates may be stored, for example, in a database, e.g., storage system 22B (shown in FIG. 1). If a verification and/or identification process is being performed, at step 230, the obtained template is passed to a matcher, which compares the template, e.g., voice print, with other existing templates in the database, e.g., voice prints, estimating the distance between them using a matching methodology (e.g., Hamming distance). Moreover, at step 230, the matcher compares the incoming signal with the templates, e.g., voice prints, stored in the storage system to identify or verify a particular user. At step 235, the output of the matching is sent to an application/device for any specified use or purpose. For example, in a call center environment, discussed above, the output may be used to create a record of a telephone conversation with separated voice streams for each participant in the telephone conversation. As a further example, in a medical professional office environment, discussed above, the output may be used to create a record of a patient's visit to a medical professional's office (e.g., a doctor's office), with separated voice streams for each participant (e.g., patient and medical professional, amongst other participants) in a medical professional office conversation.

FIG. 3 shows an exemplary flow 300 for utilizing the present invention in a call center environment. At step 305, agent and IVR seed phrases are stored in a storage system and sent to the CB/SIV tool. It should be understood that, in embodiments, the collection and storage of the agent and IVR seed phrases may be performed at any time prior to a call being received by the call center. Moreover, the collection of agent and IVR seed phrases may be performed only once. That is, with each new call, agent and IVR seed phrases need not be collected again. Rather, once the agent and IVR seed phrases are collected, they may be accessed for any future call center conversation with a caller.

Furthermore, in embodiments, the invention contemplates that other systems may be used to identify the IVR and/or agent portions of a conversation without using a matching methodology. For example, in embodiments, the present invention may be configured to determine an origin of a voice stream and filter based, in part, on the origin of the voice stream. As such, in embodiments, IVR seed phrases and/or agent seed phrases may not need to be collected.

At step 310, a caller calls into an interactive voice response (IVR) based identification and enrollment system of a call center. At step 315, the IVR system prompts the caller to speak a seed phrase. It should be understood that, in embodiments, this prompting for a seed phrase may be unknown to the caller. At step 320, the seed phrase is stored in a storage system, e.g., storage system 22B (shown in FIG. 1), and the seed phrase is sent to the CB/SIV tool.

At step 325, the call is routed to an agent. At step 340, a determination is made (e.g., by the agent) as to whether to perform caller verification. If, at step 340, a determination is made to perform caller verification, at step 345, the agent utilizes the CB/SIV tool to verify the caller by comparing the callers voice to the seed phrase voice print stored in the storage system. At step 350, the CB/SIV tool determines if the caller has been verified. If, at step 350, the caller was not verified, the process proceeds to step 355, where the agent takes appropriate action. For example, upon determining that the caller is not verified, the agent may drop the call, report the call and/or re-perform the verification, amongst other appropriate actions.

If, at step 340, a determination is made to not perform caller verification, or, at step 350, the caller is verified, the process proceeds to step 360. At step 360, the CB/SIV tool monitors the call and performs voice identification to filter the signal into separate voice streams for each participant in the call. At step 365, the CB/SIV tool stores the separate streams in a storage system, e.g., storage system 22B (of FIG. 1).

FIG. 4 shows an exemplary flow 400 for utilizing the present invention in a medical environment. At step 405, a medical professional's (e.g., a doctor's) seed phrase is stored in a storage system (e.g., storage system 22B of FIG. 1) as voice print and sent to the CB/SIV tool. Additionally, as should be understood, seed phrases for other medical professional office employees (e.g., nurses, physician assistants, etc.) may be stored in a storage system (e.g., storage system 22B of FIG. 1) as voice prints and sent to the CB/SIV tool. At step 410, the patient's seed phrase is stored in a storage system as a voice print and sent the CB/SIV tool. It should be understood that, in embodiments, step 410 may be an optional step (as indicated by the dashed lines). That is, as explained above, in embodiments, the CB/SIV tool may determine through process of elimination that a received voice is not the medical professional's voice, and thus, must be the patient's voice.

At step 415, the patient/medical professional speech/dialog interaction is recorded and passed to the CB/SIV tool. At step 420, the CB/SIV tool filters the speech/dialog into separate streams using the medical professional's voice print (and optionally, the patient's voice print). At step 425, the CB/SIV tool stores the separate streams in a storage system (e.g., storage system 22B). At step 430, the CB/SIV tool time stamps the stored separate streams. As should be understood, in embodiments, this step may be an optional step, as indicated by the dashed lines. At step 435, the CB/SIV tool applies business rules (e.g., speech-to-text conversion) to the stored separated streams to, e.g., convert the recorded speech into a text format. Additionally, as should be understood, in embodiments, this step may be an optional step, as indicated by the dashed lines.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A computer program product comprising a computer usable storage device having readable program code embodied in the storage device, the computer program product includes at least one component operable to:

filter an audio stream of a communication into separate audio streams corresponding, respectively, to each of a plurality of participants in the communication, wherein each of the separate audio streams contains portions of the communication attributable to the corresponding one of the plurality of participants;

identifying the plurality of participants by matching one or more of the portions of the communication in each of the separate audio streams to voice prints; and subsequently, in a same conversation, comparing the separate audio streams to only a plurality of the voice prints corresponding to the identified participants within the same conversation.

2. The computer program product of claim 1, wherein the at least one component is further operable to perform a verification process for at least one of the plurality of participants.

3. The computer program product of claim 1, wherein the voice prints are seed phrases received for each of the plurality of participants.

4. The computer program product of claim 1, wherein:
   providers of the voice prints are each associated with a role; and
   each of the voice prints is stored in one of a plurality of discrete databases based on the role of the associated provider.

5. The computer program product of claim 1, wherein the filtering the audio stream comprises:
   using at least one of conversational biometrics, speaker identification and speaker verification to match the one or more of the portions of the communication to the voice prints; and
   assigning the one or more portions of the communication attributable to each of the plurality of participants to the separate audio streams corresponding to each of the plurality of participants.

6. The computer program product of claim 1, further comprising at least one component operable to perform a verification of at least one of the plurality of participants by authenticating a match between a voice sample of the at least one of the plurality of participants and a previously stored voice print of the at least one of the plurality of participants.

7. The computer program product of claim 1, further comprising at least one component operable to receive the audio stream of the communication via at least one of voice transmission technology, a wired telephone, a wireless telephone and a microphone.

8. The computer program product of claim 1, further comprising at least one component operable to convert the communication from speech to text.

9. The computer program product of claim 1, wherein the communication is a call center communication and the plurality of participants includes at least two of: a caller, an agent and an interactive voice response (IVR) system.

10. The computer program product of claim 9, further comprising at least one component operable to collect, once, seed phrases for the agent and the IVR system prior to the receiving the audio stream.

11. The computer program product of claim 1, wherein the communication is a medical professional communication and the plurality of participants include at least a medical professional and a patient.

12. The computer program product of claim 1, wherein the filtering the audio stream of the communication into separate audio streams comprises using a voice print speaker identification for all but one of the plurality of participants and a process of elimination for the one of the plurality of participants.

13. The computer program product of claim 1, wherein the filtering the audio stream of the communication into the separate audio streams is performed one of in real-time and in a batch.

14. The computer program product of claim 1, wherein the filtering the audio stream of the communication into the separate audio streams further comprises determining an origin of voice of at least one of the plurality of participants.

* * * * *